United States Patent [19]
Aoyama et al.

[11] Patent Number: 5,644,226
[45] Date of Patent: Jul. 1, 1997

[54] MAGNETIC DETECTOR HAVING A BIAS MAGNET AND MAGNETORESISTIVE ELEMENTS SHIFTED AWAY FROM THE CENTER OF THE MAGNET

[75] Inventors: Seiki Aoyama, Toyohashi; Susumu Kuroyanagi; Ichirou Izawa, both of Anjo; Yasuaki Makino, Okazaki, all of Japan

[73] Assignee: Nippondenso Co., Ltd., Kariya, Japan

[21] Appl. No.: 396,241

[22] Filed: Mar. 1, 1995

[30] Foreign Application Priority Data

Mar. 2, 1994 [JP] Japan ................... 6-032693

[51] Int. Cl.⁶ .................. G01P 3/488; G01B 7/14; G01D 5/245; H01L 43/08
[52] U.S. Cl. ................ 324/207.21; 324/207.25; 338/32 R
[58] Field of Search ............ 324/207.12, 207.21, 324/207.24, 207.25, 252; 330/32 R

[56] References Cited

U.S. PATENT DOCUMENTS

| | | | |
|---|---|---|---|
| 4,712,064 | 12/1987 | Eckardt et al. | 324/207.21 |
| 5,021,736 | 6/1991 | Gonsalves et al. | |
| 5,134,371 | 7/1992 | Watanabe et al. | |
| 5,351,028 | 9/1994 | Krahn | 324/207.21 |

FOREIGN PATENT DOCUMENTS

| | | |
|---|---|---|
| 3-195970 | 8/1991 | Japan. |
| 6-174490 | 6/1994 | Japan. |

*Primary Examiner*—Walter E. Snow
*Attorney, Agent, or Firm*—Cushman, Darby & Cushman IP Group of Pillsbury Madison & Sutro LLP

[57] ABSTRACT

A magnetic detector which is small in size and is capable of preventing the occurrence of deformation in the waveform representing a change in the resistance. A bias magnet 2 is adhered to the support plate 1. A bias magnetic field is generated by the bias magnet 2 toward a gear 7. A substrate 3 is adhered onto the support plate 1, and magneto resistance elements are formed on the substrate 3 by vacuum evaporation. The magneto resistance elements are disposed in parallel with the magnetized surface of the bias magnet 2. The magneto resistance elements are disposed being tilted by about 45 degrees with respect to a vector that is in parallel with the N-pole surface of the bias magnet 2 in the bias magnetic field and is directed toward the outer peripheral edge. Due to the revolution of the gear 7, a change in the resistance takes place in the magneto resistance elements due to a change in the vector which is parallel with the N-pole surface of the bias magnet 2 in the bias magnetic field generated by the bias magnet 2 towards gear 7 and is directed toward the outer peripheral edge.

16 Claims, 11 Drawing Sheets

1

MAGNETIC DETECTOR HAVING A BIAS MAGNET AND MAGNETORESISTIVE ELEMENTS SHIFTED AWAY FROM THE CENTER OF THE MAGNET

BACKGROUND OF THE INVENTION

1. Field of the Invention

The present invention relates to a magnetic detector for detecting the motion of an object by utilizing a change in the resistance of magneto resistance elements.

2. Description of the Related Art

A revolution sensor of the gear proximity type, utilizing magneto resistance elements, has heretofore been known as disclosed in Japanese Unexamined Patent Publication (Kokai) No. 3-195970. This sensor is equipped with countermeasure against the occurrence deformation in the waveform that represents a change in the resistance. This technology will be described with reference to FIG. 18. Magneto resistance elements 21 are deposited on a substrate 20. On one surface of a support plate 22 is mounted a bias magnet 23 and on the other surface of the support plate 22 the substrate 20 is mounted perpendicular to the magnetized surface 23a of the bias magnet 23. On the substrate 20, the magneto resistance elements 21 are tilted at an angle of 45 degrees with respect to a magnetic vector (component $B_r$ in a direction perpendicular to the magnetized surface 23a) produced by the bias magnet 23. A change in the direction of magnetic vector $B_x$ accompanying the revolution of the gear 24 is detected as a change in resistance in the magneto resistance elements 21.

However, since the substrate 20 (magneto resistance elements 21) is disposed perpendicularly to the magnetized surface 23a of the bias magnet 23, the sensor is large in a direction perpendicular to the magnetized surface 23a of the bias magnet 23.

SUMMARY OF THE INVENTION

It is therefore an object of the present invention to provide a magnetic detector which is small and is capable of preventing the occurrence of deformation in the waveform that represents a change in resistance.

In order to achieve the above-mentioned object, the present invention basically employs the following technical constitution. That is, the magnetic detector according to the present invention comprises a bias magnet which has a magnetic material in the magnetized surface thereof and is opposed to an object to be detected, and further generates a bias magnetic field toward the object to be detected, and magneto resistance elements disposed in the bias magnetic field, wherein a change in resistance takes place in the magneto resistance elements due to a change in the bias magnetic field generated by the bias magnet towards the object to be detected as the object to be detected undergoes movement, and wherein the magneto resistance elements are disposed parallel with the magnetized surface of the bias magnet.

In the magnetic detector according to the present invention, furthermore, the magneto resistance elements are so disposed as to define a predetermined angle with respect to a component vector which is parallel to the magnetized surface of the bias magnet. Moreover, according to the magnetic detector of the present invention, at least two magneto resistance elements, which are arranged as a pair, are disposed in such a way that the long axes thereof define a predetermined angle with respect to a predetermined pattern axis but in directions opposite to each other.

That is, the concrete constitution of the magnetic detector according to the present invention is concerned with a magnetic detector which comprises a bias magnet which has a magnetic material in the magnetized surface thereof, and is opposed to an object to be detected, and further generates a bias magnetic field toward the object to be detected, and magneto resistance elements disposed in the bias magnetic field, wherein a change in the resistance takes place in the magneto resistance elements due to a change in the bias magnetic field generated by the bias magnet toward the object to be detected as the object to be detected undergoes movement, and wherein the magneto resistance elements are disposed in parallel with the magnetized surface of the bias magnet and are tilted by about 45 degrees with respect to a vector which is in parallel with the magnetized surface of the bias magnet in the bias magnetic field and is directed toward the outer peripheral side. As the object to be detected undergoes movement, therefore, a change occurs in the direction of a vector that is in parallel with the magnetized surface of the bias magnetic field in the bias magnetic field and is directed toward the outer peripheral side. The change in the direction of the vector is detected as a change in resistance by the magneto resistance elements that are disposed in parallel with the magnetized surface of the bias magnet. Here, since the magneto resistance elements are disposed in parallel with the magnetized surface of the bias magnet, the size of the sensor can be reduced in a direction perpendicular to the magnetized surface of the bias magnet compared with that of when the magneto resistance elements are disposed perpendicularly to the magnetized surface of the bias magnet. Besides, since the magneto resistance elements are so disposed as to define a predetermined angle with respect to a magnetic vector which is in parallel with the magnetic surface of said bias magnet provided in the bias magnetic field, and which is directed toward the outer peripheral side of said bias magnet or which is directed toward a center of said magnetic surface of said bias magnet, to thereby mainly detect a change in said magnetic vector. Therefore, in the present invention, the deformation in the detected wave-form representing a change of the resistance can be avoided.

Further, in another embodiment of the present invention, each of the magneto resistance elements is disposed with an angle of 45° with respect to the magnetic vector and thus a rate of change of resistance shows a maximum value with respect to the swing of the magnetic vector.

DETAILED DESCRIPTION OF THE INVENTION

An embodiment of the invention will now be described in conjunction with the drawings.

Figure 1:
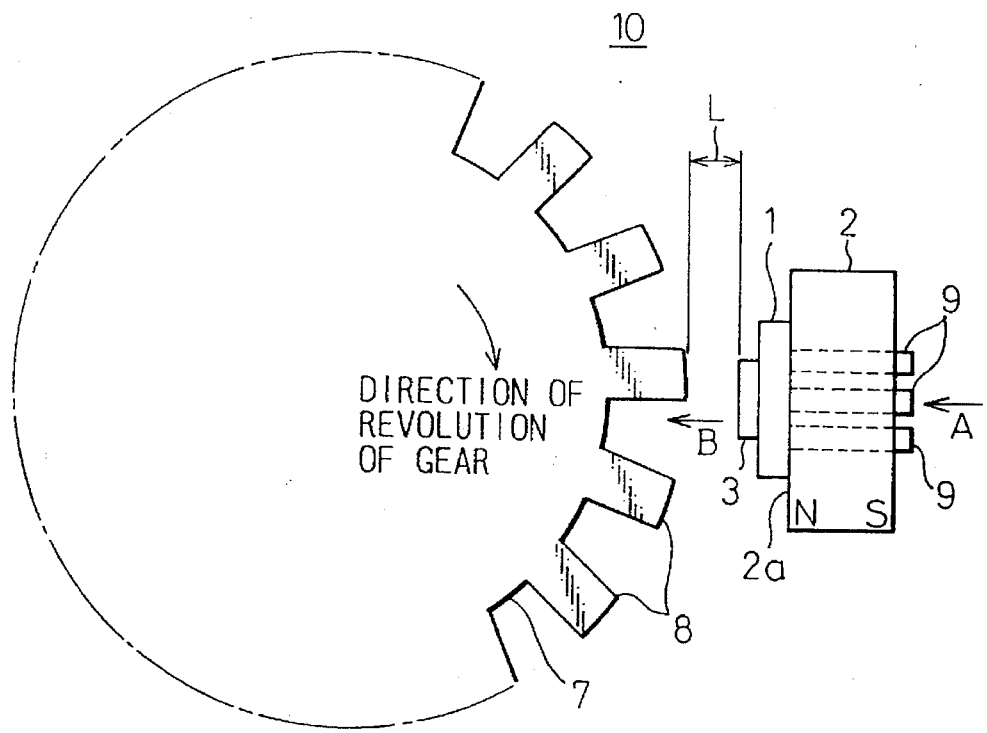
FIG. 1 is a plan view of a magnetic revolution detector according to an embodiment.
Figure 2:
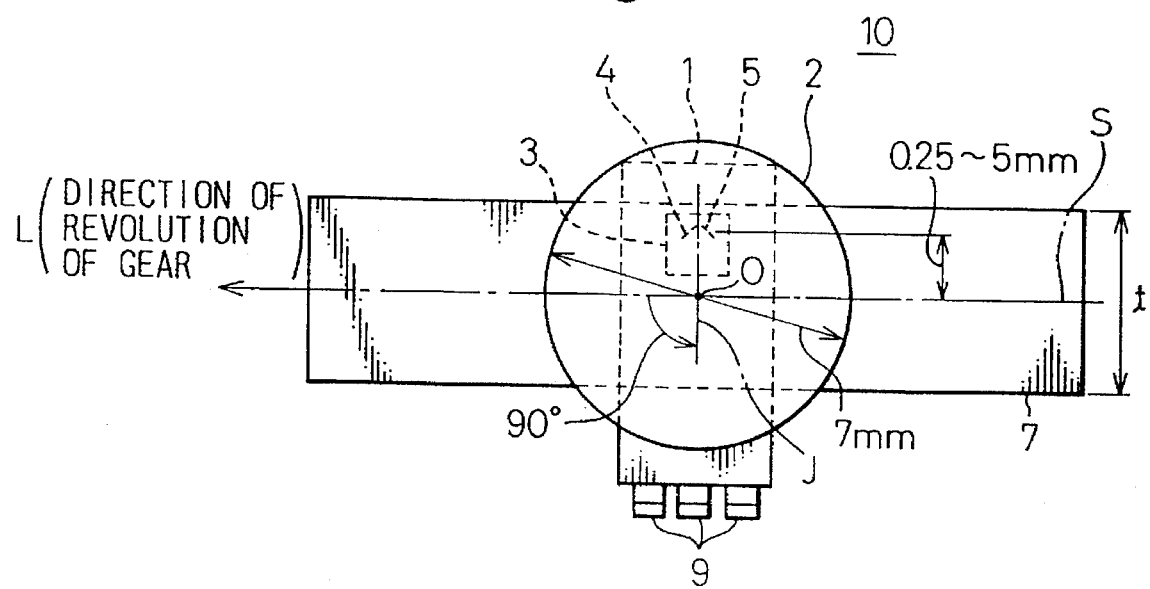
FIG. 2 is a diagram of the detector shown in FIG. 1 viewed from the direction of arrow A.

FIG. 1 is a plan view of a magnetic revolution detector according to the embodiment, and FIG. 2 is a diagram of the detector shown in FIG. 1 viewed from the direction of arrow A.

That is, FIG. 1 illustrates a magnetic detector which comprises a bias magnet 2 which has a magnetic material in the magnetized surface 2a thereof, is opposed to an object 7 to be detected, and further generates a bias magnetic field B toward the object 7 to be detected, and magneto resistance elements 4, 5 disposed in the bias magnetic field B, wherein a change in the resistance takes place in the magneto resistance elements 4, 5 due to a change in the bias magnetic field B generated by the bias magnet toward the object 7 to be detected as the object 7 undergoes movement, and wherein the magneto resistance elements 4, 5 are disposed in parallel with the magnetized surface of the bias magnet 2.

In the magnetic detector 10 of the present invention, furthermore, it is desired that the magneto resistance elements 4 and 5 are so disposed as to define a predetermined angle with respect to a component vector $B_x$ which is parallel with the magnetized surface of the bias magnet 2. Moreover, according to the magnetic detector 10 of the present invention, it is desired that the component vector $B_x$ in parallel with the magnetized surface is directed from the center of the bias magnet 2 toward the outer peripheral side of the bias magnet 2, and that the magneto resistance elements 4 and 5 are arranged in such a manner that the longitudinal axes thereof define an angle of about 45 degrees with respect to the vector $B_x$ which is in parallel with the magnetized surface.

The magnetic detector 10 of the present invention will now be described in further detail with reference to FIG. 1, wherein a support plate 1 has a rectangular shape. The bias magnet 2 which is a permanent magnet can have a rectangular shape or a cylindrical shape. When formed in a cylindrical shape, the bias magnet 2 has an outer diameter of 7 mm. One surface of the bias magnet 2 is a north pole and the other surface thereof is a south pole. One surface (the north pole surface 2a) of the bias magnet 2 is adhered to one surface of the support plate 1.

A substrate 3 is provided on the support plate 1, and the object 7 to be detected has teeth 8.

Figure 3:
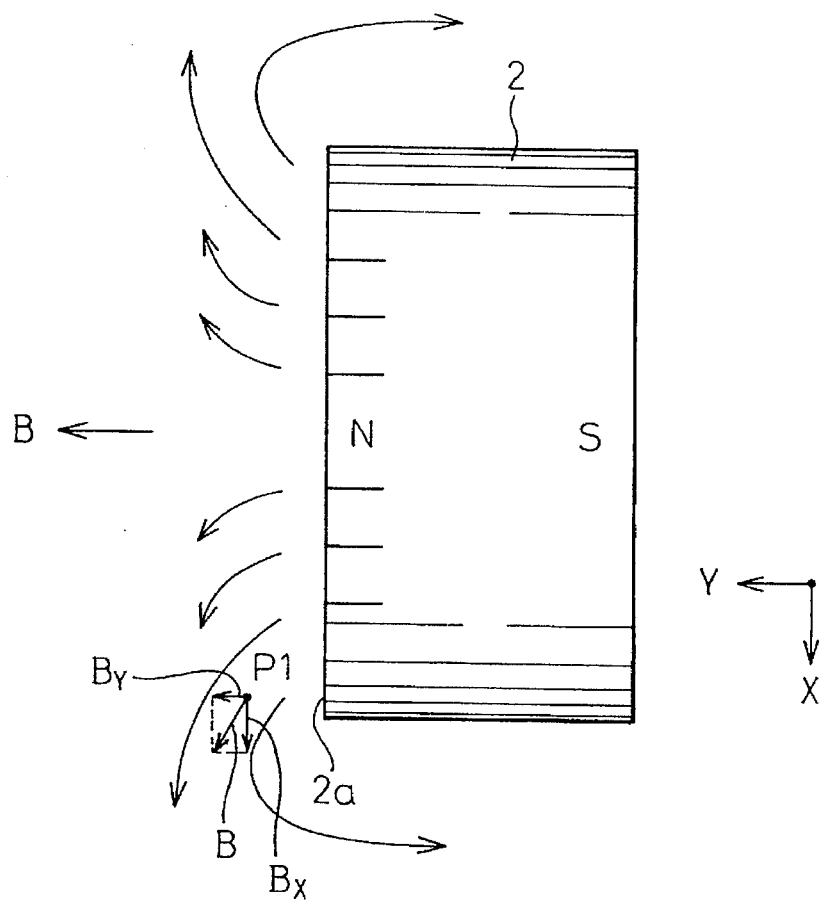
FIG. 3 is a side view illustrating the lines of magnetic force of a bias magnet.
Figure 4:
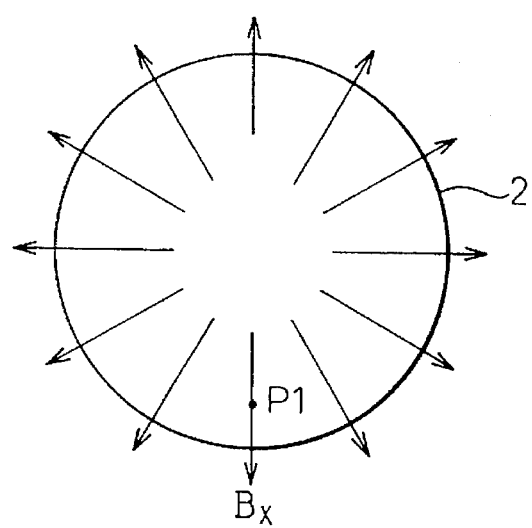
FIG. 4 is a diagram of a bias magnet as viewed in the direction of arrow B.

FIG. 3 illustrates the lines of magnetic force from the north pole surface 2a to the south pole surface of the cylindrical bias magnet 2, and FIG. 4 is a diagram of the magnet shown in FIG. 3 viewed in the direction of arrow B. Referring to FIG. 3, at a position P1 slightly separated away from the N-pole surface 2a of the bias magnet 2, the magnetic vector B is composed of a vector $B_x$ which is directed toward the outer peripheral side in parallel to the N-pole surface 2a of the bias magnet 2 and a vector $B_y$ in a direction perpendicular to the N-pole surface 2a of the bias magnet 2. Hereinafter, the vector $B_x$ directed toward the outer peripheral side in parallel with the N-pole surface 2a of the bias magnet 2 is referred to as "the component vector parallel with the N-pole surface", and the vector $B_T$ in a direction perpendicular to the N-pole magnetized surface 2a of the bias magnet 2 is referred to as "the component vector perpendicular to the N-pole surface".

Figure 5:
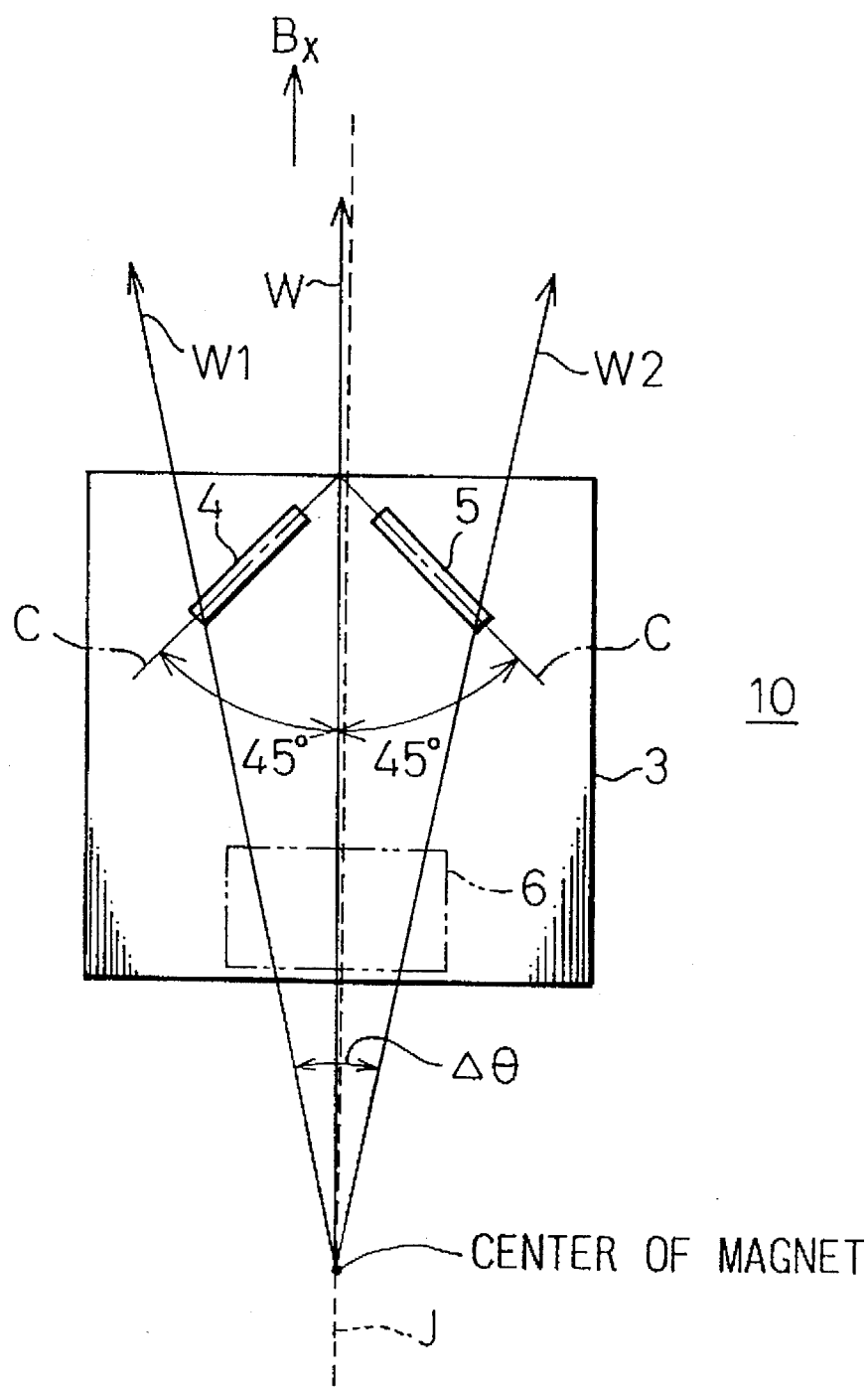
FIG. 5 is a plan view of a substrate.

As shown in FIG. 1, furthermore, to the other surface of the support plate 1 is adhered one surface of the rectangular substrate 3. As shown in FIG. 5, on the surface of the substrate 3 are formed two magneto resistance elements 4 and 5 by vacuum evaporation. Thus, the magneto resistance elements 4 and 5 are disposed in parallel with the N-pole surface 2a of the bias magnet 2.

The magneto resistance elements 4 and 5 are in the form of straight bars with long axes. The magneto resistance elements 4 and 5 are disposed as a pair defining angles of about plus and minus 45 degrees, respectively, with respect to the direction (designated at W in FIG. 5) of the component vector $B_x$ in parallel with the N-pole surface in the magnetic vector B generated from the bias magnet 2. The magneto resistance elements 4 and 5 have a width of 8 μm and acquire magnetic field intensities greater than a saturation magnetic field intensity when the component vector $B_x$ in parallel with the N-pole surface and the component vector $B_y$ perpendicular to the N-pole surface are both larger than 100 gauss at the positions where the magneto resistance elements 4 and 5 are disposed.

In the magnetic detector 10 of the present invention, it is desired that at least two of the magneto resistance elements 4 and 5 are used and that the at least two magneto resistance elements are arranged in pairs. In this case, it is essential that the magneto resistance elements 4 and 5 are disposed in a manner as shown in FIG. 5, so that the longitudinal axes C of the magneto resistance elements define a predetermined angle θ with respect to a predetermined axis J but in directions opposite to each other.

In the present invention, it is desired that the predetermined angle is about 45 degrees.

According to the present invention, the pattern for disposing the magneto resistance elements is not limited to the one shown in FIG. 5, i.e., the important point is that the magneto resistance elements are symmetrically disposed with respect to the pattern axis J and in the opposite directions.

As shown in FIG. 5, furthermore, a waveform processing circuit 6 is formed on the surface of the substrate 3. Further, as shown in FIGS. 1 and 2, the support plate 1 is provided with three output leads 9 through which signals are output from the waveform processing circuit 6 on the substrate 3.

As shown in FIG. 1, the object 7 to be detected is made of a magnetic material in the form of a gear 7 which has a number of teeth 8. The substrate 3 is so disposed to be opposed to a tooth 8 of the gear 7. As shown in FIG. 2, furthermore, the center O of the bias magnet 2 is located on the center line S of the gear 7 in the direction of the thickness t thereof. The magneto resistance elements 4 and 5 are disposed at positions at right angles to the direction L in which the gear revolves (in a direction turned by 90 degrees counterclockwisely relative to the direction in which the gear revolves). Moreover, the magneto resistance elements 4 and 5 are arranged at positions separated by 0.25 to 5.0 mm from the center of the bias magnet 2.

That is, the distance from the center O of the bias magnet 2 to the magneto resistance elements 4 and 5 is determined depending upon the thickness t of the gear 7 and the diameter of the bias magnet 2, and lies within a range in which the magnetic vector oscillates as will be described later and in a range where the saturation magnetic field intensity of the magneto resistance elements 4 and 5 is exceeded.

The substrate 3, on the surface of which are formed the magneto resistance elements 4 and 5 by vacuum evaporation, is disposed in a magnetic circuit constituted by the bias magnet 2 and the gear 7 with the N-pole surface $2a$ of the bias magnet 2 opposed to the gear 7. Referring to FIG. 5, the magneto resistance elements 4 and 5 subtend an angle of about 90 degrees, so that each of them defines an angle of about 45 degrees with respect to the component vector $B_x$ parallel with the N-pole surface in the magnetic vector B.

Described below is a principle for detecting magnetism.

According to this embodiment, the magnetism detected by the magneto resistance elements 4 and 5 is the component vector $B_x$, parallel with the N-pole surface, in the magnetic vector B. When there is no tooth 8 opposed to the N-pole surface $2a$ of the bias magnet 2, the component vector $B_x$ in parallel with the N-pole surface is in the direction W shown in FIG. 5. When the tooth 8 is present, the component vector $B_x$ in parallel with the N-pole surface changes its direction W over a range from W1 to W2 because it is attracted by the tooth 8 of the gear 7 that is revolving, whereby the angle of deflection of the component vector $B_x$ in parallel with the N-pole surface (change in the direction of the magnetic vector $B_x$ at positions where the magneto resistance elements 4 and 5 are disposed) becomes $\Delta\theta$ with the center of the bias magnet 2 as a reference. Here, the angle of deflection $\Delta\theta$ varies depending upon the distance between the bias magnet 2 and the magneto resistance elements 4, 5, and upon the distance between the magneto resistance elements 4, 5 and the gear 7.

Figure 6:
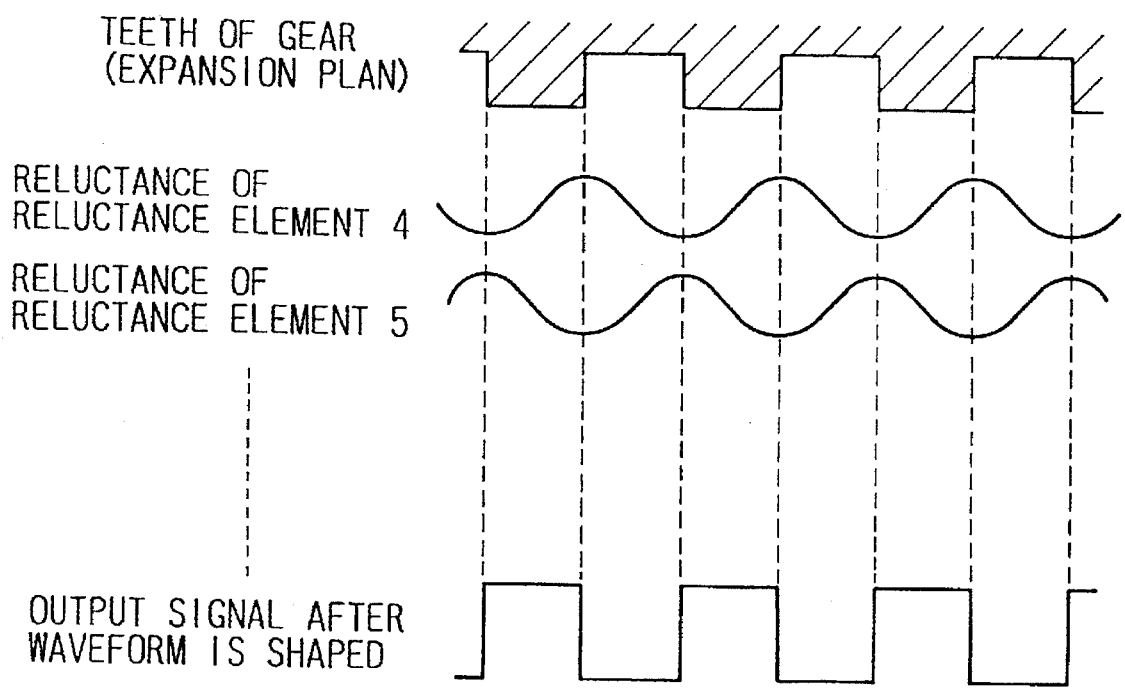
FIG. 6 is a diagram of waveforms for explaining the operation of the sensor.

The pair of magneto resistance elements 4 and 5 disposed at an angle of 90 degrees (45 degrees with respect to W) detect the angle of deflection $\Delta\theta$ of the component vector $B_x$ in parallel with the N-pole surface in the magnetic vector B as shown in FIG. 6, and change their resistance in reverse phase. Changes in the resistance are converted into binary values, through the waveform processing circuit 6 provided on the substrate, to form pulses that corresponds to the teeth 8 of the gear 7.

Note that, in the present invention, the same technical conception as the conventional one used in the magnetic detector as disclosed in the Japanese Unexamined Patent Publication (KOKAI) No. 3-195970 can be applied to the magnetic detector of the present invention.

And since in the present invention, a magnetic vector which changes in a plane which is parallel with magnetic surface of the magneto resistance elements, can be detected, even when the detected signal caused by the change in the resistance, is digitized by a wave-form processing circuit 6, a problem can be avoided in that when a gap formed between an object to be detected and the magneto resistance elements is unintentionally narrowed, a deformation of the wave-form, for example, two peak values are generated in one sampling time, which reduces a counted number of the output pulses into double.

Accordingly, in the above-mentioned embodiment, the angle formed between the magneto resistance elements 4, 5 and a direction W of the magnetic vector Bx (a radial direction) is not necessarily set at 45°.

Thus, magneto resistance elements 4, 5 may be disposed so that the angle formed between the magneto resistance elements 4, 5 and the magnetic vector which changes with respect to a movement of the object to be detected, can be set an optional different value from 45°.

Note that as explained in the Japanese Unexamined Patent Publication (KOKAI) No. 3-195970, when the magnetic vector Bx can swing within a rang from W1 to W2 with respect to the direction W as a center of the range, a rate of change in the magneto resistance of the magneto resistance elements becomes maximum when the above-mentioned angle is set at 45° or 135°.

Accordingly, it is preferable that the above-mentioned angle is set at 45°.

Further, in this case, the angle formed between the magneto resistance elements 4 and 5, is set at 90° and therefore, a direction of the change in the resistance value of one magneto resistance element has a phase opposite to that of the another magneto resistance element to thereby the maximum output voltage can be obtained.

Regarding the arrangement of the magneto resistance elements 4 and 5, each of them may be disposed with an angle of 60° with respect to the direction W, respectively, or with an angle of 135° with respect to the direction W, respectively.

Alternatively, they may be disposed with an optional angle being different from each other, with respect to the direction W, respectively.

In the present invention, the magnetic detector may have technical construction in that the magneto resistance elements are so disposed as to define a predetermined angle with respect to a magnetic vector which is in parallel with the magnetic surface of the bias magnet provided in the bias magnetic field, and which is directed toward the outer peripheral side of the bias magnet or which is directed toward a center of the magnetic surface of the bias magnet, to thereby mainly detect a change in the magnetic vector.

On the other hand, in the present invention, as shown in the above-mentioned embodiment, since a predetermined change in the magnetic vector can be detected when the two magneto resistance elements are disposed in the vicinity of the predetermined magnetic vector, the change in the magnetic vector can be stably detected.

Further, in the present invention, the change in the magnetic vector can be detected only one position, and thus when the magneto resistance elements are arranged on one surface of a substrate, a size of the detector can be advantageously minimized.

It is confirmed that in the above-mentioned embodiment, no deformation occurs in the waveform representing a change in the resistance with respect to a distance between the gear 7 and the magneto resistance elements 4, 5, in practical use.

Described below are results obtained through a variety of experiments.

Figure 7:
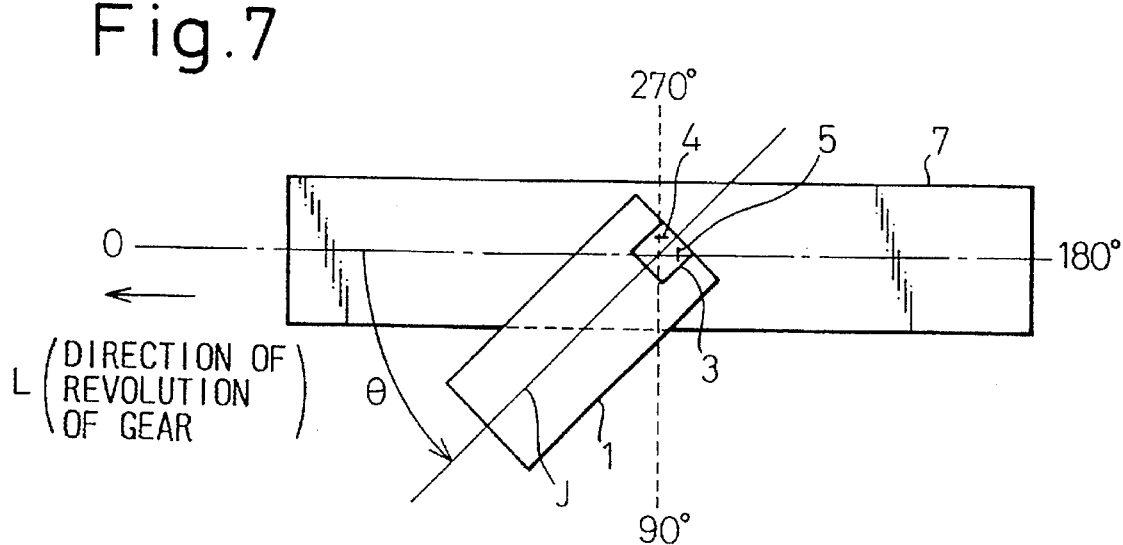
FIG. 7 is a diagram for explaining the disposition of a gear and the magneto resistance elements.
Figure 9:
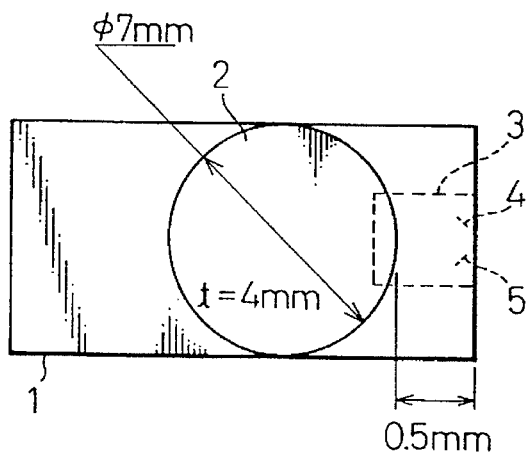
FIG. 9 is a diagram for explaining the disposition of the bias magnet and the magneto resistance elements.
Figure 10:
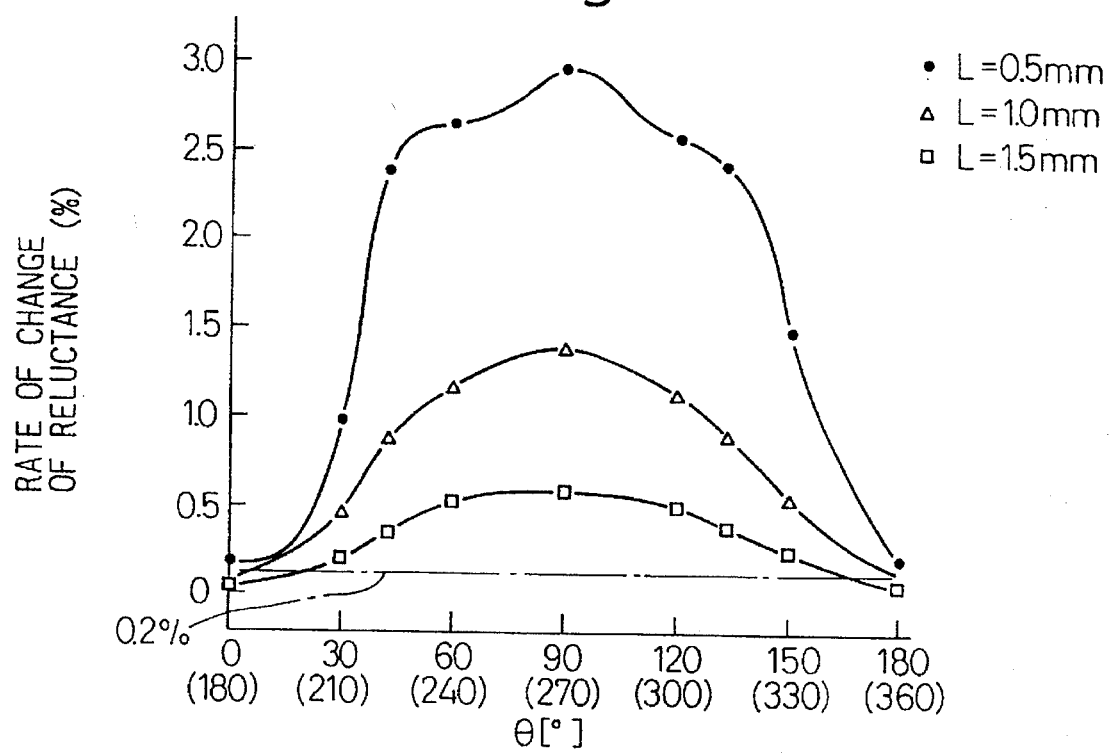
FIG. 10 is a graph showing the measured results of rates of change of resistance with respect to the element disposition angle θ.
Figure 11:
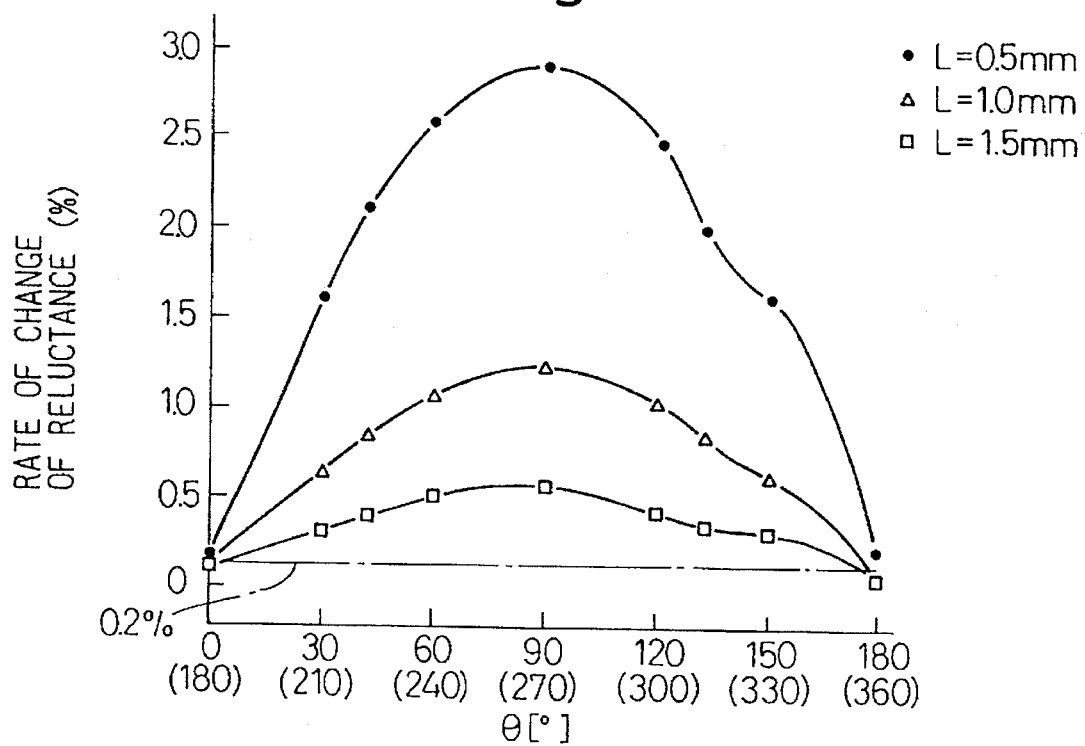
FIG. 11 is a graph showing the measured results of rates of change of resistance with respect to the element disposition angle θ.

Referring to FIG. 7, the rate of change of resistance of magneto resistance elements 4, 5 was measured by changing the angle θ subtended by the direction in which the gear 7 revolves and the magneto resistance elements 4, 5 on the substrate 3 in the counterclockwise direction. The measured results were as shown in FIGS. 10 and 11. As shown in FIG. 9, the measurement was taken under the conditions of using a bias magnet 2 of a rare earth type having a diameter of 7 mm and a thickness of 4 mm, and disposing the magneto resistance elements 4 and 5 at positions 0.5 mm away from the outer peripheral surface of the bias magnet 2. FIG. 10 shows the measured results of when the gear 7 has a diameter of 75 mm, 48 teeth 8 and a thickness t of 10 mm. FIG. 11 shows the measured results of when the gear 7 has a diameter of 85 mm, 48 teeth 8 and a thickness t of 3 mm. Furthermore, FIGS. 10 and 11 show the experimental results of when the distance L between the magneto resistance elements 4, 5 and the gear 7 was changed into 0.5 mm, 1.0 mm and 1.5 mm as shown in FIG. 1.

Figure 8:
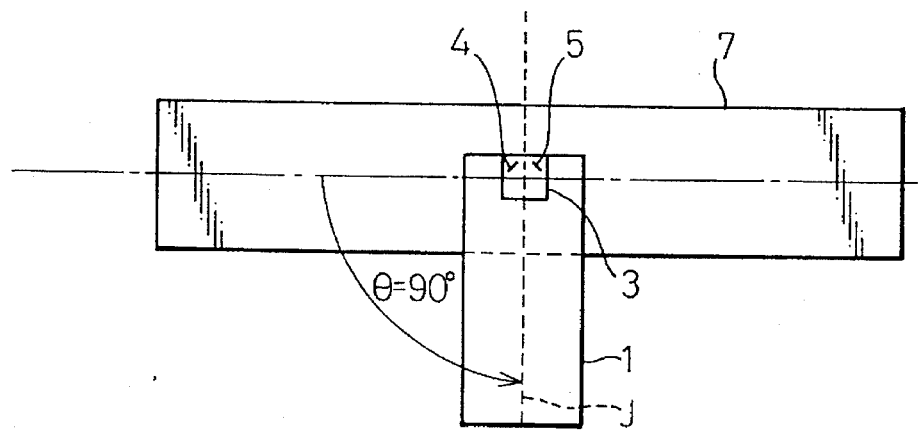
FIG. 8 is a diagram for explaining the disposition of the gear and the magneto resistance elements.

From FIGS. 10 and 11, a change in the resistance is obtained over the range of θ=0° to 360° except at at 0°, 180° and 360°. Furthermore, when the limit of detection by the waveform processing circuit 6 is about 0.2% in terms of a rate of change of resistance, it was learned that a rate of change of resistance necessary for detecting the gear was obtained over about 30°<θ<150° and about 210°<θ<330°. It was further confirmed that the rate of change of resistance becomes a maximum at θ=90° and 270°. That is, when θ=90° as shown in FIG. 8, there is obtained a maximum rate of change of resistance.

By taking into consideration the error in the air gap (distance L between the magneto resistance elements 4, 5 and the gear 7), during packaging or assembling, it is learned that the support plate (magneto resistance elements 4, 5) should be so arranged with respect to the gear 7 that the angle θ lies in a range of about 30°<θ<150° or about 210°<θ<330°.

In FIG. 2, therefore, the positions where the magneto resistance elements 4 and 5 are disposed are such that the pattern axis J of the disposition pattern is at right angles (θ=90°) with respect to the direction L in which the gear revolves. The magneto resistance elements 4 and 5, however may be disposed at positions where the angle lies within a range of 30°<θ<150° or 210°<θ<330°.

That is, in the magnetic detector 10 of the present invention, it is essential that the magneto resistance elements 4 and 5 are so disposed that the pattern axis J of the disposition pattern defines a predetermined angle with respect to the direction L in which the object 7 to be detected moves, and it is desired that the predetermined angle is set to be from 30 degrees to 150 degrees or from 210 degrees to 330 degrees. It is particularly desired that the predetermined angle is set to 90 degrees or 270 degrees.

Figure 12:
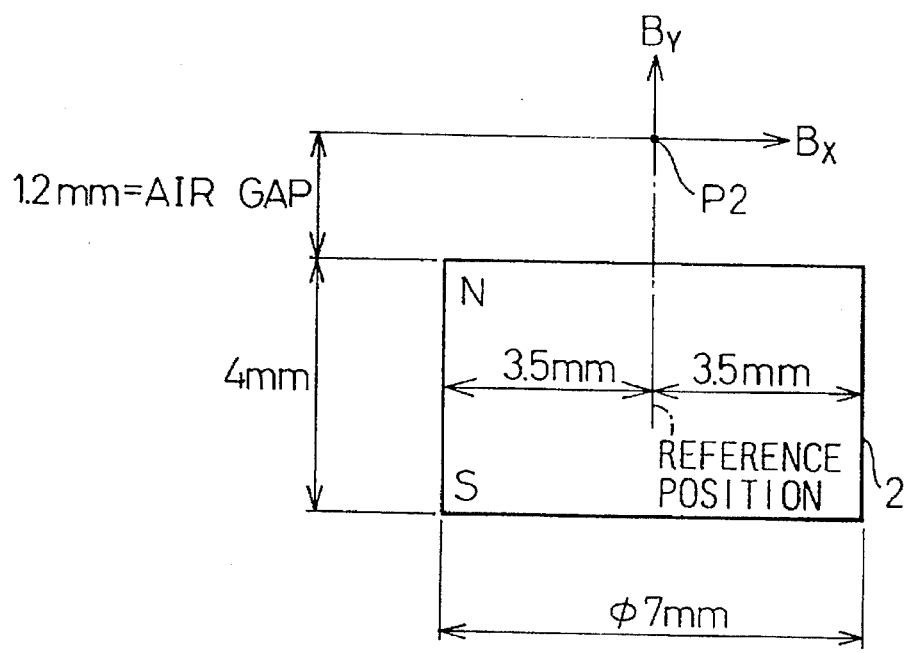
FIG. 12 is a side view of the bias magnet.
Figure 14:
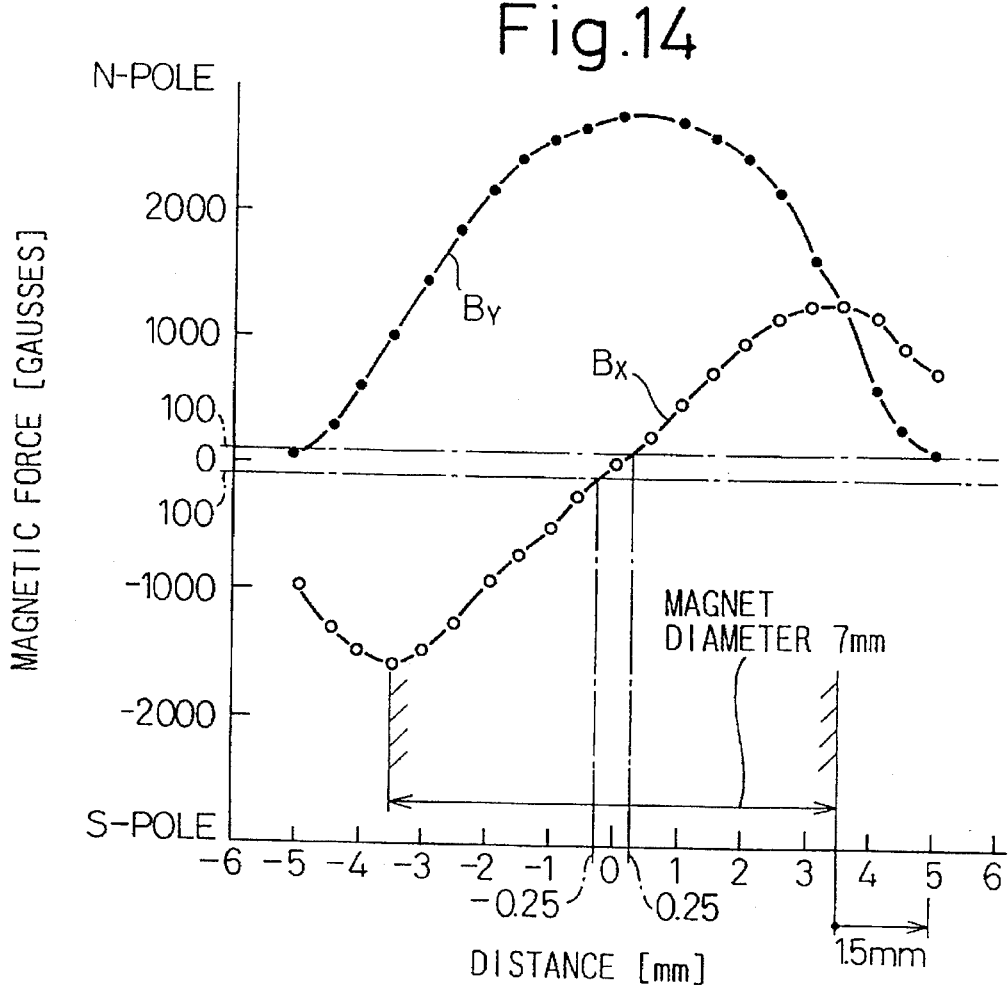
FIG. 14 is a graph showing the measured results of magnetic force relative to the distance from the center of magnet.

FIG. 14 shows the measured results of a component vector $B_x$ in parallel with the N-pole surface and a component vector $B_y$ perpendicular to the N-pole surface measured at a position P2 separated by 1.2 mm away from the N-pole surface of the bias magnet 2 as shown in FIG. 12. Here, as shown in FIG. 12, the bias magnet 2 possessed an outer diameter of 7 mm and a thickness of 4 mm. In FIG. 14, the abscissa represents the distance in the radial direction from the center of the bias magnet 2 with the center of the bias magnet 2 as a reference position, and the ordinate represents the magnetic force of component vector $B_x$ in parallel with the N-pole surface and the magnetic force of component vector $B_y$ perpendicular to the N-pole surface.

From FIG. 14, the intensity of the component vector $B_x$ in parallel with the N-pole surface becomes [0], which is the smallest, at the center of the bias magnet 2, increases as it separates away from the center, and acquires a maximum value on the outer peripheral surface of the bias magnet 2 and, then, gradually decreases as it separates away from the outer peripheral surface of the bias magnet 2. The magnetic force of the component vector $B_x$ in parallel with the N-pole surface becomes smaller than ±100 gauss within a range of ±0.25 mm from the center of the bias magnet 2. In other words, the magnetic force becomes greater than ±100 gauss outside the range of ±0.25 mm from the center of the bias magnet 2.

On the other hand, the magnetic force of the component vector $B_y$ perpendicular to the N-pole surface becomes a maximum at the center of the bias magnet 2 and decreases away from the center. The magnetic force becomes smaller than +100 gauss at more than +5.0 mm away from the center of the bias magnet 2.

Therefore, in order for both the component vector $B_x$ in parallel with the N-pole surface and the component vector $B_y$ perpendicular to the N-pole surface to be larger than 100 gauss and for the magneto resistance elements 4 and 5 to assume intensities larger than a saturation magnetic field intensity, it is necessary that the magneto resistance elements 4 and 5 are separated by more than 0.25 mm away from the center of the bias magnet 2 but are located within 1.5 mm from the outer peripheral surface of the bias magnet 2.

Figure 13:
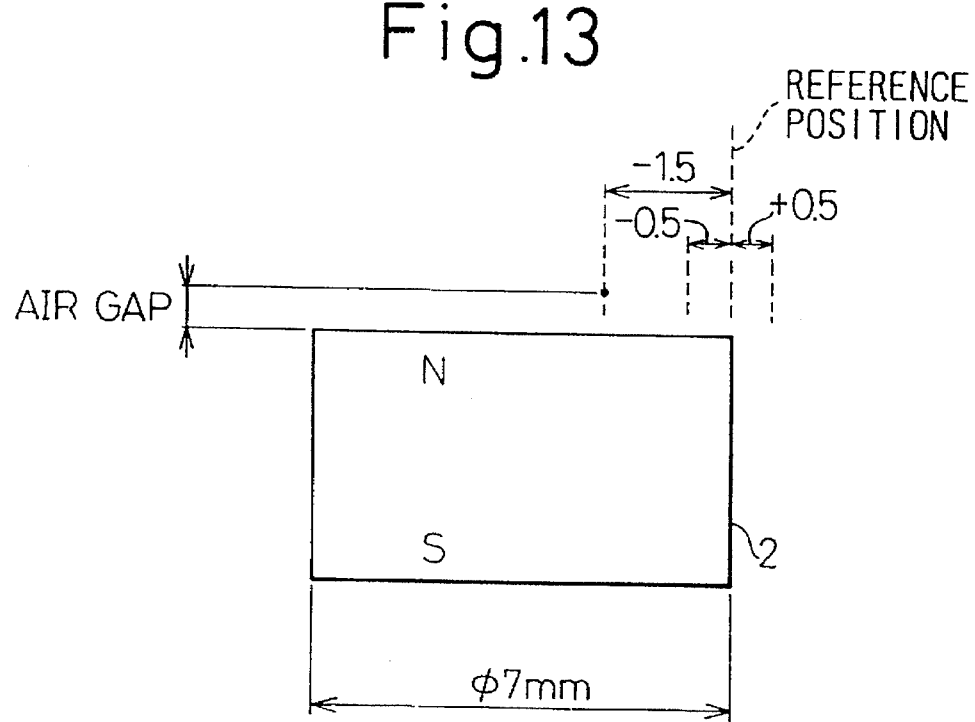
FIG. 13 is a side view of the bias magnet.
Figure 15:
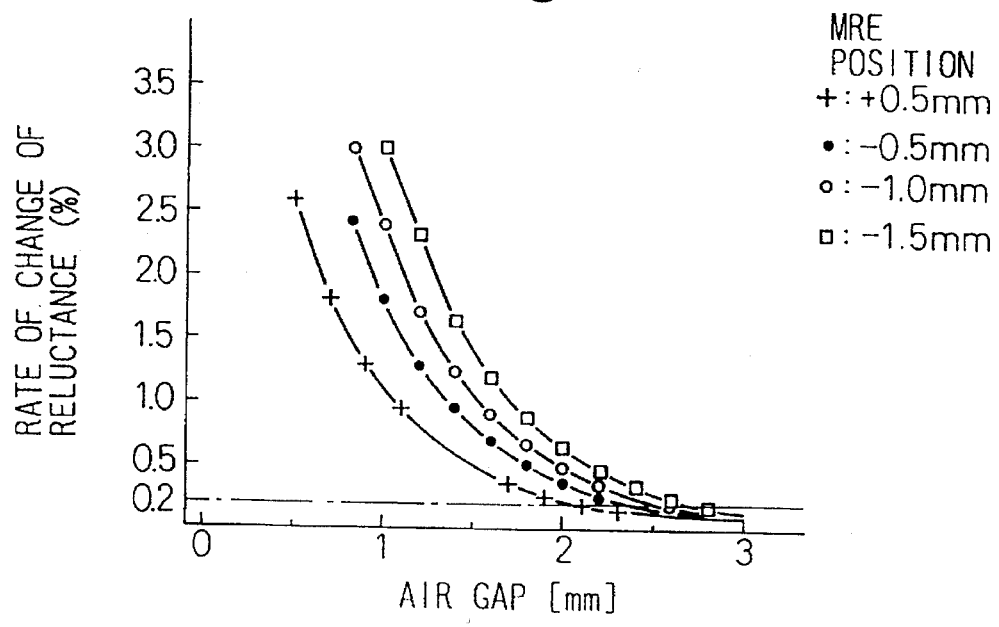
FIG. 15 is a graph showing the measured results of rates of change of resistance relative to the air gap.

FIG. 15 shows the measured results of rates of change of resistance when the radial distance of the magneto resistance elements 4 and 5 is changed from the reference position under the conditions where the outer peripheral surface of the bias magnet 2 serves as a reference position as shown in FIG. 13, the gear 7 has a diameter of 85 mm, 48 teeth 8, and θ=0, wherein the abscissa represents the distance (air gap) from the N-pole surface of the bias magnet 2 end the ordinate represents the rate of change of reluctance.

It will be understood from FIG. 15 that a required rate of change of resistance is obtained when the magneto resistance elements 4 and 5 are disposed near the outer peripheral surface of the bias magnet 2 (+0.5 mm to −1.5 mm).

In FIG. 2, therefore, though the magneto resistance elements 4 and 5 were disposed over a range of from 0.25 to 5 mm from the center of the bias magnet 2 (having a diameter of 7 mm), they may be disposed near the outer peripheral surface of the bias magnet 2 at positions of 3.5 mm away from the center of the bias magnet 2. In this case, the required rate of change of resistance is obtained even when the positions deviate to some extent.

Figure 16:
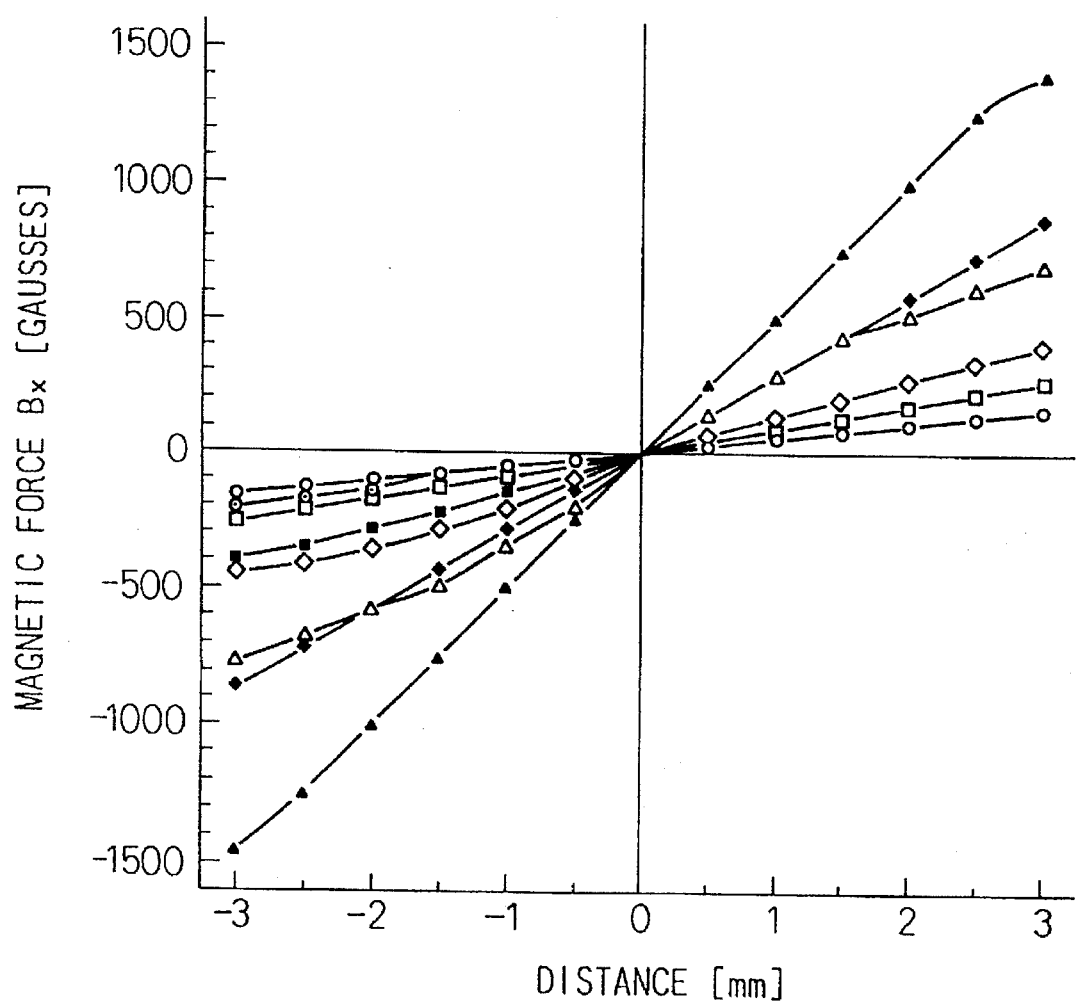
FIG. 16 is a graph showing the measured results of magnetic force $B_x$ relative to the distance from the center of magnet.
Figure 17:
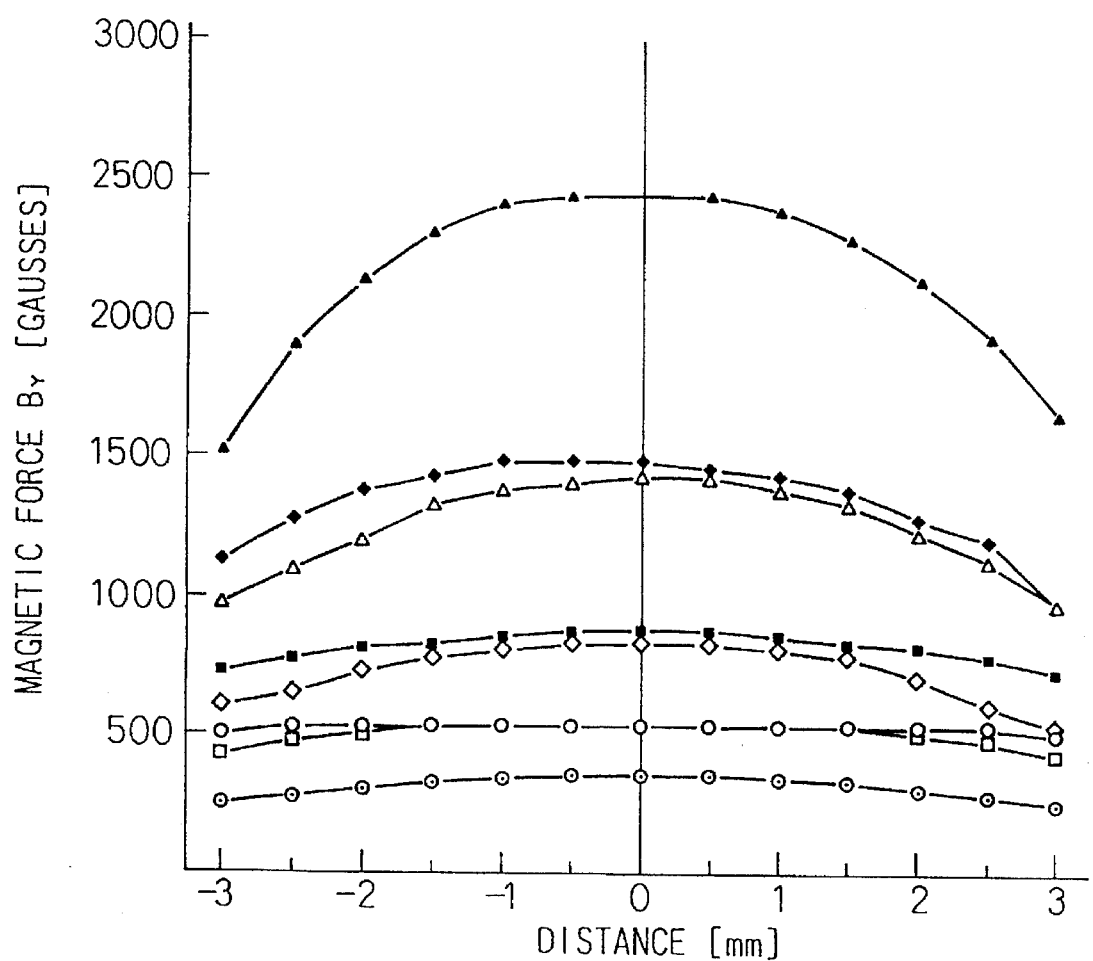
FIG. 17 is a graph showing the measured results of magnetic force $B_y$ relative to the distance from the center of magnet.

FIGS. 16 and 17 show the measured results of the magnetic force of the component vector $B_x$ in parallel with the N-pole surface (FIG. 16) and of the component vector $B_y$ perpendicular to the N-pole surface (FIG. 17) for a variety of bias magnets. The measuring conditions were the same as those of the measurement of FIG. 14. In FIGS. 16 and 17, the abscissa represents the distance form the center of the bias magnet.

Figure 18:
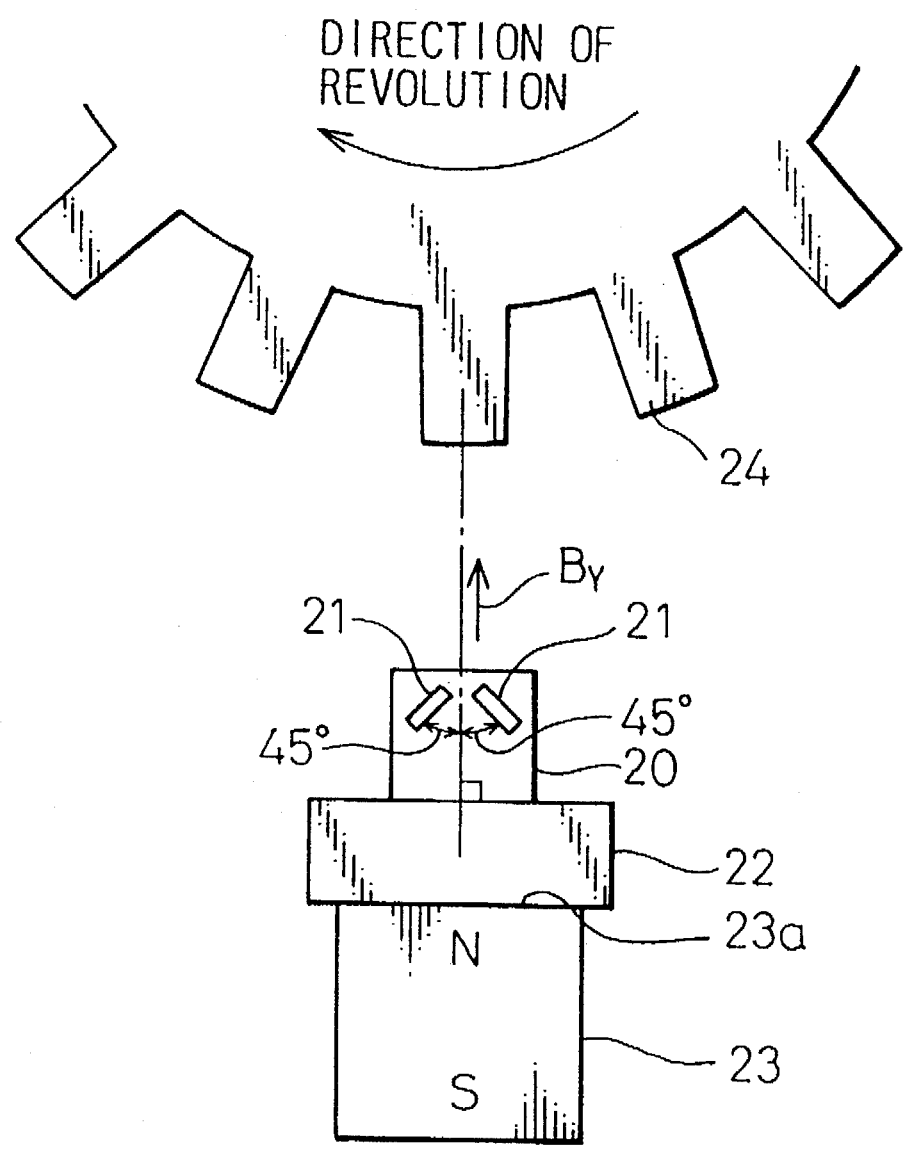
FIG. 18 is a plan view of a conventional revolution sensor.

According to the embodiment described above, the magneto resistance elements 4 and 5 are disposed in parallel with the N-pole magnetized surface of the bias magnet 2 and are tilted by about 45 degrees with respect to the vector $B_x$ that is in parallel with the N-pole surface of the bias magnet 2 in the bias magnetic field and is directed toward the outer peripheral side of the bias magnet 2. When the substrate was disposed perpendicularly to the N-pole surface of the bias magnet 2, the sensor tended to become bulky in the direction perpendicular to the magnetized surface. With the magneto resistance elements 4 and 5 being disposed in parallel with the N-pole surface of the bias magnet 2 however, it can be reduced in size. That is, with the substrate 3 being disposed in parallel with the N-pole magnetized surface, the structure can be realized in a size that is reduced in a direction perpendicular to the magnetized surface as compared to the one in which the substrate 3 is disposed perpendicular to the N-pole surface. According to the conventional device shown in FIG. 18, a contrivance was necessary to hold the substrate 2 perpendicularly to the magnetized surface 23a of the bias magnet 23. According to the embodiment of the invention, however, the bias magnet 2, support plate 1 and substrate 3 are arranged in parallel with each other and can, hence, be easily held together with an adhesive or the like, and can be easily assembled while maintaining improved precision. Besides, since the magneto resistance elements 4 and 5 are disposed being tilted by about 45 degrees with respect to the vector $B_x$ that is in parallel with the N-pole surface of the bias magnet 2 in the bias magnetic field and is directed toward the outer peripheral side, there does not occur any deformation in the waveform representing a change of resistance.

Since the magneto resistance elements 4 and 5 are disposed at positions turned by 30 to 150 degrees or 210 to 330 degrees with respect to the direction L in which the gear 7 revolves, it is possible to increase the rate of change of resistance and, hence, to reliably maintain the rate of change of resistance.

Besides, since the magneto resistance elements 4 and 5 are disposed at positions turned by 90 degrees or 270 degrees with respect to the direction L in which the gear 7 revolves, it is allowed to further increase the rate of change of resistance.

Magneto resistance elements 4 and 5 are arranged at positions that are separated away from the center of the bias magnet 2 such that the required value of the vector $B_x$ is obtained but are not so separated away from the outer periphery of the bias magnet 2 that the required value of the vector $B_y$ is obtained. That is, the magneto resistance elements 4 and 5 are arranged at positions within a range which is separated by more than 0.25 mm away from the center of the bias magnet 2 but are not separated by more than 1.5 mm from the outer peripheral surface thereof. Accordingly, the magnetic intensity is larger than the saturation magnetic field intensity of the magneto resistance elements 4 and 5 (both $B_x$ and $B_y$ are not smaller than 100 gauss), and a change in the magnetic vector $B_x$ is obtained due to the revolution of the gear 7.

With the magneto resistance elements 4 and 5 being disposed near the outer peripheral surface of the bias magnet 2, in particular, a sufficiently largo rate of change of resistance is obtained even when their positions are deviated to some extent at the time of mounting.

It should be noted that the present invention is in no way limited to the above-mentioned embodiment only. For instance, the bias magnet need not be of a cylindrical shape but may be of any shape provided the magnetic vector is generated toward the outer peripheral edge from the center of the magnet.

According to one embodiment of the present invention, as described above in detail, it is possible to decrease the size as well as to prevent the occurrence of deformation in the waveform representing a change of resistance. According to another embodiment of the invention, furthermore, it is possible to increase the rate of change of resistance in addition to obtaining the effects of the first embodiment of the present invention. According to the third embodiment of the present invention, it is possible to further increase the rate of change of resistance in addition to obtaining the effects of the second embodiment of the present invention. According to the fourth embodiment of the present invention, it is possible to obtain a sufficiently large rate of change of resistance even when the magneto resistance elements are disposed at slightly deviated positions in addition to obtaining the effects of the first embodiment thereof.

Further, in the present invention, the rate of change in the resistance can be enlarged.

We claim:

1. A magnetic detector which comprises:

a bias magnet which has a magnetic material in the magnetized surface thereof, and is opposed to an object to be detected, and further generates a bias magnetic field toward said object to be detected;

and magneto resistance elements disposed in said bias magnetic field;

wherein the magneto-resistance elements are disposed in a pattern having a center and the bias magnet has a center, the center of the pattern being shifted away from the center of the bias magnet, wherein a change in the resistance takes place in said magneto resistance elements accompanying a change in said bias magnetic field generated from said bias magnet toward said object to be detected as said object to be detected undergoes movement, wherein said magneto resistance elements are disposed in parallel with the magnetized surface of said bias magnet, wherein said magneto resistance elements are so disposed as to define a predetermined angle with respect to a component vector which is in parallel with the magnetized surface of said bias magnet, wherein said magneto resistance elements are so disposed that the longitudinal axes thereof define an angle of about 45 degrees with respect to the component vector which is in parallel with said magnetized surface, and wherein the distance between the center of the pattern of the magneto resistance elements and the center of the bias magnet is such that a magnetic filed intensity is greater than a saturation magnetic field intensity of the magneto resistance elements.

2. A magnetic detector according to claim 1, wherein the component vector in parallel with said magnetized surface is directed from the central portion of said bias magnet toward the outer peripheral edge of said bias magnet.

3. A magnetic detector according to claim 1, wherein at least two magneto resistance elements are disposed as a pair.

4. A magnetic detector according to claim 3, wherein said magneto resistance elements are disposed in such a pattern that the long axes thereof define a predetermined angle with respect to a predetermined pattern axis but in the directions opposite to each other.

5. A magnetic detector according to claim 4, wherein said magneto resistance elements are so disposed that said pattern axis of said disposition pattern defines a predetermined angle with respect to a direction in which said object to be detected moves.

6. A magnetic detector according to claim 5, wherein said predetermined angle is from 30 degrees to 150 degrees or from 210 degrees to 330 degrees.

7. A magnetic detector according to claim 6, wherein said predetermined angle is 90 degrees or 270 degrees.

8. A magnetic detector according to claim 1, wherein said magneto resistance elements are disposed near the outer peripheral portion of said bias magnet.

9. A magnetic detector according to claim 1, wherein the bias magnet comprises of a rare earth type material and has a diameter of 7 mm and a thickness of 4 mm, and the distance between the center of the pattern of the magneto-resistance elements and the center of the bias magnet is in the range of 0.25 mm to 5 mm.

10. A magnetic detector according to claim 1, wherein the magneto-resistance elements are carried by a substrate.

11. A magnetic detector according to claim 10, wherein the substrate is arranged on the bias magnet via a supporting plate.

12. A magnetic detector which comprises:
 a bias magnet which has a magnetic material in the magnetized surface thereof, and is opposed to an object to be detected, and further generates a bias magnetic field toward said object to be detected;
 and magneto resistance elements disposed in said bias magnetic field;
 wherein the magneto-resistance elements are disposed in a pattern having a center and the bias magnet has a center, the center of the pattern being shifted away from the center of the bias magnet,
 wherein a change in the resistance takes place in said magneto resistance elements accompanying a change in said bias magnetic field generated from said bias magnet toward said object to be detected as said object to be detected undergoes movement,
 wherein said magneto resistance elements are disposed in parallel with the magnetized surface of said bias magnet,
 wherein the distance between the center of the pattern of the magneto resistance elements and the center of the bias magnet is such that a magnetic field intensity is greater than a saturation magnetic field intensity of the magneto resistance elements,
 wherein said magneto resistance elements are so disposed as to define a predetermined angle with respect to a magnetic vector which is in parallel with the magnetic surface of said bias magnet provided in the bias magnetic field, and which is directed toward the outer peripheral side of said bias magnet or which is directed toward a center of said magnetic surface of said bias magnet, to thereby mainly detect a change in said magnetic vector, and
 wherein said predetermined angle is from 30 degrees to 150 degrees or from 210 degrees to 330 degrees.

13. A magnetic detector according to claim 12, wherein said magneto resistance elements are disposed near the outer peripheral portion of said bias magnet.

14. A magnetic detector which comprises:
 a bias magnet which has a magnetic material in the magnetized surface thereof, and is opposed to an object to be detected, and further generates a bias magnetic field toward said object to be detected;
 and magneto resistance elements disposed in said bias magnetic field;
 wherein the magneto-resistance elements are disposed in a pattern having a center and the bias magnet has a center, the center of the pattern being shifted away from the center of the bias magnet,
 wherein a change in the resistance takes place in said magneto resistance elements accompanying a change in said bias magnetic field generated from said bias magnet toward said object to be detected as said object to be detected undergoes movement,
 wherein said magneto resistance elements are disposed in parallel with the magnetized surface of said bias magnet,
 wherein the distance between the center of the pattern of the magneto resistance elements and the center of the bias magnet is such that a magnetic field intensity is greater than a saturation magnetic field intensity of the magneto resistance elements,
 wherein said magneto resistance elements are so disposed as to define a predetermined angle with respect to a magnetic vector which is in parallel with the magnetic surface of said bias magnet provided in the bias magnetic field, and which is directed toward the outer peripheral side of said bias magnet or which is directed toward a center of said magnetic surface of said bias magnet, to thereby mainly detect a change in said magnetic vector, and
 wherein said predetermined angle is 90 degrees or 270 degrees.

15. A magnetic detector which comprises:
 a bias magnet which has a magnetic material in the magnetized surface thereof, and is opposed to an object to be detected, and further generates a bias magnetic field toward said object to be detected;
 and magneto resistance elements disposed in said bias magnetic field;
 wherein the magneto-resistance elements are disposed in a pattern having a center and the bias magnet has a center, the center of the pattern being shifted away from the center of the bias magnet,
 wherein a change in the resistance takes place in said magneto resistance elements accompanying a change in said bias magnetic field generated from said bias magnet toward said object to be detected as said object to be detected undergoes movement,
 wherein said magneto resistance elements are disposed in parallel with the magnetized surface of said bias magnet,
 wherein said magneto resistance elements are so disposed as to define a predetermined angle with respect to a component vector which is in parallel with the magnetized surface of said bias magnet,
 wherein said magneto resistance elements are so disposed that the longitudinal axes thereof define an angle of about 45 degrees with respect to the component vector which is in parallel with said magnetized surface,
 wherein the distance between the center of the pattern of the magneto resistance elements and the center of the bias magnet is such that a magnetic filed intensity is greater than a saturation magnetic field intensity of the magneto resistance elements, and
 wherein the distance between the center of the pattern of the magneto resistance elements and the center of the bias magnet is such that the magnetic force of a magnetic vector running parallel to the magnetized surface from the center of the bias magnet toward the peripheral region of the bias magnet is outside the range of ±100 gauss.

16. A magnetic detector which comprises:
 a bias magnet which has a magnetic material in the magnetized surface thereof, and is opposed to an object to be detected, and further generates a bias magnetic field toward said object to be detected;

and magneto resistance elements disposed in said bias magnetic field;

wherein the magneto-resistance elements are disposed in a pattern having a center and the bias magnet has a center, the center of the pattern being shifted away from the center of the bias magnet, wherein a change in the resistance takes place in said magneto resistance elements accompanying a change in said bias magnetic field generated from said bias magnet toward said object to be detected as said object to be detected undergoes movement, wherein said magneto resistance elements are disposed in parallel with the magnetized surface of said bias magnet, wherein said magneto resistance elements are so disposed as to define a predetermined angle with respect to a component vector which is in parallel with the magnetized surface of said bias magnet, wherein said magneto resistance elements are so disposed that the longitudinal axes thereof define an angle of about 45 degrees with respect to the component vector which is in parallel with said magnetized surface, wherein the distance between the center of the pattern of the magneto resistance elements and the center of the bias magnet is such that a magnetic filed intensity is greater than a saturation magnetic field intensity of the magneto resistance elements, and wherein the distance between the center pattern of the magneto resistive elements and the center of the bias magnet is such that the magnetic force of a magnet vector running perpendicular to the magnetized surface is outside the range of ±100 gauss.

* * * * *